July 20, 1954 F. J. LINGEL 2,684,457

ASYMMETRICALLY CONDUCTIVE UNIT

Filed Sept. 4, 1951

Inventor:
Fred J. Lingel,
by Merton D. Morse
His Attorney.

Patented July 20, 1954

2,684,457

UNITED STATES PATENT OFFICE 2,684,457

ASYMMETRICALLY CONDUCTIVE UNIT

Fred J. Lingel, Syracuse, N. Y., assignor to General Electric Company, a corporation of New York Application September 4, 1951, Serial No. 244,909

9 Claims. (Cl. 317—234)

Figures 1, 2, 3, 4, 5, 6, 7:
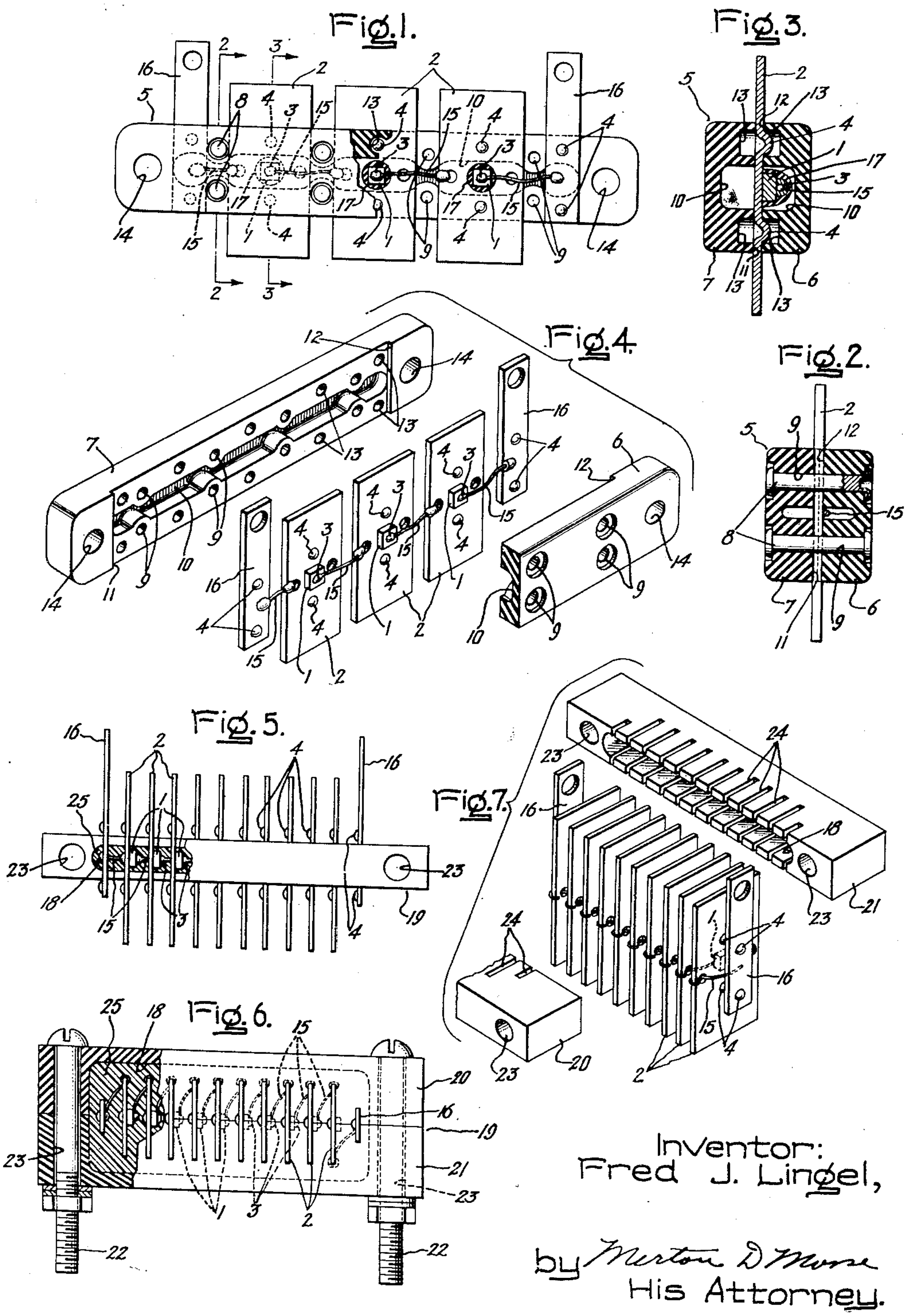

My invention relates in general to asymmetrically conductive units and in particular to protective mounting and connecting devices for asymmetrically conductive units comprising series circuit combinations of two or more rectifying elements of the type exemplified by "broad area" P-N junction germanium crystals.

In the copending application of Robert N. Hall, Serial No. 187,478, filed September 29, 1950, and assigned to the assignee of the present application, an improved asymmetrically conductive device, and the method of making same, is disclosed and claimed. This device, which is the subject of the said copending application, makes possible the practical realization of a broad area rectification barrier between two oppositely conduction-characterized portions of a semiconductor material, such as germanium or silicon, thereby to accommodate much greater rectified currents as contrasted to the currents accommodated by the prior small area "cat whisker" or point contact type of semiconductor asymmetrically conductive devices. The said "broad area" asymmetrically conductive device is embodied in a piece or wafer or semiconductor material which contains a portion thereof characterized as negative conduction type (N-type) in which conduction is effected by movement of free electrons, and a portion thereof characterized as positive conduction type (P-type) in which conduction is effected by means of the movement of what have become known as "positive holes" which arise from electron vacancies in the electron orbital structures of the semi-conductor material atoms. Intermediate these two portions, the N-type and the P-type, there exists a thin layer or rectification barrier, called a P-N junction, which is intrinsic, i. e., neither N-type nor P-type, and through which electric current may flow with ease in only one direction, conventionally from the P-type portion to the N-type portion. The term "broad area," as applied to semiconductor rectifying elements for purposes of this specification, is defined as meaning an area broad relative to the smaller area of point-contact types of rectifying elements which are well known in the art. For example, the point-contact type of rectifying elements have an effective rectification area usually around 0.0005″ in diameter and rarely have one which exceeds 0.001″ in diameter. The broad area type rectifying elements described herein have an effective rectification area or P-N junction rarely less than .001 sq. in. and may have an area considerably greater than 0.10 sq. in.

An N-type portion of semiconductor may be created by the presence of a very minute amount of impurities in the material which are predominantly "donors," i. e., impurities such as antimony and phosphorus which furnish additional free electrons to the semiconductor, while a P-type portion of semiconductor may be created by the presence of impurities which are predominantly "acceptors," i. e., impurities such as indium and aluminum which function to accept electrons from the semiconductor and leave "positive holes" in the atom structures thereof. Accordingly, the new and improved broad area asymmetrically conductive device may comprise a piece of semiconductor material having a deposit of a donor impurity on one face thereof and a deposit of an acceptor impurity on another face thereof, the impurities being induced, as by heat, to penetrate the semiconductor toward each other until an intrinsic barrier or P-N junction exists between the boundaries of penetration. It is further possible to start with a piece entirely of N-type semiconductor and by inducing the penetration of an acceptor impurity thereinto, produce a P-N junction; conversely, the semiconductor may be wholly P-type whereupon the penetration of a donor impurity thereinto produces a P-N junction.

Without here reciting further details of the theory and construction of the broad area asymmetrically conducting device, for which reference to the aforementioned copending application may be had, it is important to note the requirements to be satisfied in obtaining the maximum of the operational advantages to be gained from the device. In the first place, the area of the rectification barrier or P-N junction may be made as large as is consistent with the desired current capacity of a given device and while the forward resistance, i. e., resistance to current flow in the desired direction, is decreased with greater area, the back resistance, i. e., resistance to current flow in the opposite direction, is unfortunately decreased more by proportion. Further, the larger the area of the rectification barrier or P-N junction, the more probable it is that a defect or one or more weak spots may exist therein, so that back voltages safely imposed thereon are lower. Consequently, for high quality rectification properties, i. e., a high ratio of back to forward resistance, or for high voltage applications or for both, it is expedient to make several such devices having relatively limited broad area P-N junctions, for example, P-N junctions resulting from impurity deposits having contact areas with the semiconductor wafers in the order of 0.01 sq. in. or less, and to connect the devices with like polarity in series circuit combination. Any desired rectified current capacity may then be obtained by connecting several such series combinations in parallel, to the end that high quality rectification accommodating high back voltages and high forward currents may be obtained.

Secondly, the broad area asymmetrically conductive device should be operated in the absence of moisture or a humid atmosphere in order that moisture does not directly, or through chemical or electrolytic action indirectly, short out the P-N junction barrier, thereby lowering the back resistance of the device. Thirdly, such asymmetrically conductive devices should be provided with means for cooling them during operation so that even greater currents may be accommodated for a given barrier area without an undue temperature rise which might cause impairment of the high quality rectification characteristics, or undue additional penetration of the impurities to the extent that the P-N junction is destroyed.

Accordingly, it is a primary object of my invention to provide an asymmetrically conductive unit which employs broad area asymmetrically conductive semiconductor elements of the type described and which affords high quality rectification accommodating relatively large back voltages.

Another object of my invention is to provide a mounting device for two or more serially connected elements of the type described which affords protection of the elements from moisture and humid atmospheres, as well as mechanical damage.

Another object of my invention is to provide such a mounting device which affords cooling and enhanced operation of the asymmetrically conductive elements.

Still another object of my invention is to provide an asymmetrically conductive unit which may be conveniently mounted in electrical equipment with very little consumption of space.

In the fulfillment of the aforestated objectives, my invention is embodied in one form by an asymmetrically conductive unit comprising a plurality of semiconductor pieces or wafers, such as germanium wafers, to each of which there is secured on the surface a conductive sheet member extending considerably beyond the wafer itself and providing a supporting base and terminal for the wafer, and to each of which there is secured on the surface a connecting terminal which may be a deposit of an impurity material, there being a broad area P-N junction in each wafer between the sheet member and the connecting terminal thereon. A housing of insulating material is provided which includes two housing sections held together by any well known fastening means and which defines an enclosed cavity and a plurality of entrances to the cavity. The wafers are positioned in spaced relation within the cavity with the sheet members secured thereto extending through the entrances. Within the cavity are means, such as soldered wire connections, connecting the wafers in series cascade relation with like polarity, each connection being made from the sheet member, i. e., supporting base terminal, of one wafer to the connecting terminal of the next adjacent wafer. Means for providing electrical connections external of the housing to the enclosed series-connected combination of the wafers extend from within the cavity through one of the entrances thereto. The housing may be mounted in any convenient manner, for example, by means of the same fasteners which hold the two housing sections together. The remaining space within the cavity may be filled, or the exposed surfaces of the wafers and the impurity deposits coated, with a moisture-protective material; preferably a thermoplastic material, so that impairment of the rectification qualities of the wafers by moisture is precluded. At the same time, the heat generated within the wafers during operation is conducted away and radiated by the sheet members which extend out of the housing, so that relatively large rectified currents may be accommodated; and since the rectifying wafers are serially connected, large inverse voltages may be safely withstood. Further, the soldered wire connections are protected from mechanical injury by being completely enclosed within the housing.

The novel features of my invention are pointed out with particularity in the appended claims. However, the invention itself, together with further objects and advantages thereof, may best be understood by reference to the following description taken in conjunction with the accompanying drawing, in which:

Fig. 1 is an elevational view, partially broken away, of a first exemplary embodiment of the asymmetrically conductive unit of my invention; Fig. 2 is an enlarged sectional view taken along line 2—2 of Fig. 1; Fig. 3 is an enlarged sectional view taken along line 3—3 of Fig. 1; Fig. 4 is an exploded perspective representation of the unit shown in Fig. 1; Fig. 5 is an elevational view, partially broken away, of a second embodiment of my invention; Fig. 6 is a plan view, partially broken away, of the unit shown in Fig. 5; and Fig. 7 is an exploded perspective view of the unit shown in Fig. 5.

Referring now to Figs. 1 through 4, which illustrate a first embodiment of the asymmetrically conductive unit of my invention, I have shown a plurality of semiconductor pieces or wafers 1 which, in accordance with the copending Hall application, supra, are individual asymmetrically conductive broad area P-N junction semiconductor elements. A plurality of conductive metal sheet members 2, which serve also as support bases and terminals, are each conductively secured, as for instance by bonding, to the surface, preferably a major face as shown, of one of wafers 1 while a plurality connecting terminals, which may be impurity deposits 3, are also each secured to the surface, preferably the opposite major face, of one of wafers 1. The semiconductor material for wafers 1 may be, for example, germanium or silicon, each having a broad area, i. e., broad as compared to the area of a point or "cat whisker" contact, P-N junction or intrinsic barrier intermediate the sheet member 2 and the impurity deposit 3 thereon. This P-N junction may be created by taking a wafer 1 of any conduction type and placing donor and acceptor impurities on the faces thereof, e. g. making deposit 3 of indium, which is an acceptor impurity, and either making sheet member 2 of antimony which is a donor impurity, or bonding a layer of antimony between the conductive sheet member 2 and wafer 1. By inducing the two impurities to penetrate the wafer 1, a P-type semiconductor portion is produced in the region of wafer 1 adjacent the acceptor impurity while an N-type semiconductor portion is produced in the region of wafer 1 adjacent the donor impurity. Between the two boundaries of impurity penetration an intrinsic semiconductor layer of P-N junction is former. However, a satisfactory P-N junction may also be realized by taking a wafer 1 of a predetermined conduction type and inducing thereinto a single selected impurity, e. g., by taking a wafer 1 of N-type semiconductor material and making deposit 3 of an acceptor impurity such as indium, a P-N junction is formed at the boundary of penetration of the acceptor impurity. In this case, no donor impurity is required and sheet member 2 may be made of any good electrically conductive material, such as fernico. Further, the connecting terminals illustrated as impurity deposits 3 may be of any good conducting material, for once the P-N junction is formed the impurity material may be removed and replaced by a deposit of solder or any other connecting means. In general, however, it is most convenient to leave the impurity deposit present and employ it as a connecting terminal. Thus, sheet members 2 and impurity deposits 3 form individual terminals for the individual asymmetrically conductive devices formed by the wafers 1 having P-N junctions therein. As previously mentioned, the impurity deposits 3 are preferably made to have relatively small areas of contact, in the order of 0.01 sq. in., in order that the resulting rectification barrier P-N junctions, while of extremly broad areas in comparison to point contact areas usually having a diameter in the order of 0.0005″, are not likely to contain weak spots susceptive to breakdown under inverse voltage or to have unduly low back resistances impairing high quality rectification. Connections to the impurity deposits 3 may be made by bonding lead wires thereto, preferably by fusing lead wires directly into the impurity deposits themselves. The sheet members 2 extend considerably from the wafers 1 to which they are secured as shown, and preferably extend in all directions. Sheet members 2 not only serve as individual terminals for the wafers 1 but also serve as means for cooling the wafers during operation and as means for supporting the wafers. To this end, sheet members 2 are preferably made of a good thermally conductive as well as a good electrically conductive material and the extending surfaces made as great as necessary for the required heat radiating capacity. Each of the sheet members 2 may be provided with two projections 4 thereon, located on opposite sides of the associated wafer 1, to afford mounting within a housing as will be presently described.

In order to construct an asymmetrically conductive unit including a plurality of wafers 1 connected in series, I provide a housing 5 which serves to hold sheet members 2 in spaced relation and thus to hold wafers 1 in spaced relation, which serves to protect wafers 1 and the connections thereto from mechanical injury and damaging moisture, and which affords cooling of wafers 1 by heat conduction through, and radiation from, sheet members 2. Housing 5 is made of an insulating material, preferably a plastic which may be molded, and includes two preferably identical housing sections 6 and 7 which fit together in close cooperative proximity. Any well known means may be provided to fasten sections 6 and 7 together, for example, a plurality of rivets 8 may extend in fastening relation through registering openings 9 in sections 6 and 7, as shown most clearly in Fig. 2. Housing 5 defines therewithin an enclosed cavity 10 and a plurality of slot entrances to cavity 10, best seen in Fig. 2 which illustrates two entrances 11 and 12. Further, a plurality of indentations or depressions 13 are defined in the surfaces of at least one of sections 6 and 7 which define entrances 11 and 12, depressions 13 receiving projections 4 to secure sheet members 2 as will be presently explained. Sections 6 and 7 also have registering openings 14 in the extremities thereof through which fasteners such as bolts, not shown, may be passed to mount housing 5 on or in electrical equipment.

As illustrated in the drawing, housing 5, cavity 10, and entrances 11 and 12 are all elongated along a first dimension relative to the remaining two dimensions thereof and wafers 1 are held in coplanar spaced relation within cavity 10 by means of projections 4 being clamped in engagement within depressions 13, sheet members 2 thus extending in coplanar spaced relation through slot entrances 11 and 12 to the exterior of housing 5. Means connecting the wafers 1 in electrical series combination may be provided, for example, by a plurality of lead wires 15 each of which is soldered to the sheet member 2 of one wafer 1 and fused into the impurity deposit 3 on the next adjacent wafer 1. The remaining end sheet member 2 and impurity deposit 3 are each connected to an electrical terminal 16 for the series combination, the terminals 16 being secured within cavity 10 by projections 4 thereon which engage depressions 13, in the same manner as sheet members 2 are secured. Terminals 16 extend through housing 5, i. e., through entrance 12, so that external electrical connection may be made to the asymmetrically conductive unit.

It will be apparent to those skilled in the art, however, that one of the two illustrated external terminals, i. e., that terminal 16 on the left in the drawing which is connected to the end sheet member 2, may be omitted since external electrical connection to the left end of the asymmetrically conductive unit may be made directly to the sheet member 2 on the left with the same result. Only one external terminal 16, as such, is therefore necessary to the unit, although two may be employed if it is desired. I prefer to employ two terminals 16 as shown in the drawing since they may be formed to cooperate with the receptacles of a connecting socket so that the complete asymmetrically conductive unit may be easily mounted and connected simply by plugging it into a socket. To protect the wafers 1 from the damaging effects of humid atmospheres and moisture, a coating 17 of a suitable moisture-protective material, such as a thermoplastic resin, wax, or lacquer, is applied to surround the exposed surfaces of wafers 1 and the impurity deposits 3 thereon. This protects the surface of wafer 1 at the place where the P-N junction is present and prevents the P-N junction from being shorted out by moisture or compounds created by electrolysis or chemical reaction due to the presence of moisture.

The complete asymmetrically conductive unit, then, may be mounted by means of openings 14 in housing 5 which holds and protects the series connected wafers 1 and connected electrically by means of terminal 16. During operation, heat generated within wafers 1 is conducted out of the housing and radiated by sheet members 2 so that relatively high currents may be accommodated without damage by heat.

Turning next to Figs. 5, 6 and 7, I have shown a second embodiment of my invention which includes a plurality of wafers 1, having P-N junctions therein and a plurality of sheet members 2 and connecting terminals, i. e., impurity deposits 3, secured thereto, as previously described in conjunction with Figs. 1 through 4. In this embodiment the wafers 1 and sheet members 2 are arranged in spaced parallel plane relation, with means for connecting the wafers 1 in electrical series combination, such as wire leads 15 each soldered to the sheet member 2 of one wafer 1 and soldered, or preferably fused, to the impurity deposit 3 of the next adjacent wafer 1. The wafers 1, impurity deposits 3 thereon, and the lead wires 15 are all mounted within an enclosed elongated cavity 18 defined by a housing 19 which includes two housing sections 20 and 21. Housing sections 20 and 21 are made of an insulating material such as fiber board or molded plastic, and are held together by fastening means such as bolts 22 passing through registering openings 23 therein. Bolts 22 may extend beyond the fastened housing, as shown, so that they may also be used to mount the complete unit on a chassis, panel, or the like. The fastened housing sections 20 and 21 define therein elongated cavity 18 and a plurality of parallel slot entrances 24 to cavity 18 which are oriented transverse to the major axis of the cavity in spaced parallel relation. The unit is assembled by sliding housing sections 20 and 21 toward one another, the sheet members 2 entering entrances 24 with projections 4 external of the housing, so that, with the housing sections fastened together, the sheet members 2 extend through slot entrances 24 in spaced parallel planes with the wafers 1 and the connections 15 thereto contained within cavity 18, the projections 4 on either side of the housing 19 precluding any movement of sheet members 2 relative to housing 19. Terminals 16, also having projections 4 thereon, are held in a similar manner within housing 19, being connected to the series combination within cavity 18 and extending through housing 19 to afford electrical connection to the unit. It will also be apparent that the terminal 16 on the left in the drawing, which is connected to the end sheet member 2, may be omitted and external electrical connection made directly to that sheet member 2. At the time that the two housing sections are fastened together, the cavity 18 is supplied with a quantity 25 of moisture-protective material such as a thermo-plastic synthetic resin or a wax so that the cavity 18 containing wafers 1, sheet members 2, impurity deposits 3, lead wires 15, and terminals 16 is otherwise filled with the moisture protective material 25 as most clearly illustrated in Fig. 6.

The same features described in connection with the first-described embodiment apply to this second embodiment as well, except that one dimension of this second described embodiment is not as small in comparison with the remaining two dimensions thereof. The insulated, protective mounting of the series-connected wafers 1 with protection from mechanical or moisture damage and cooling of wafers 1 during operation is provided in both embodiments. A specific feature of this second embodiment is that a relatively great number of wafers 1 may be spaced therein within a small volume since the coplanar arrangement of sheet members 2 permits closer spacing of wafers 1.

While the present invention has been described by reference to particular embodiments thereof, it will be understood that modifications may be made by those skilled in the art without actually departing from the invention. I, therefore, aim in the appended claims to cover all such equivalent variations as come within the scope of the foregoing disclosure.

What I claim as new and desire to secure by Letters Patent of the United States is:

1. An asymmetrically conductive unit comprising a plurality of semiconductor wafers, a plurality of conductive metal sheet members each secured to one face of one of said wafers and extending therefrom, a plurality of connecting terminals each secured to the opposite face of one of said wafers, a broad area rectification barrier being present within each of said wafers between the sheet member and the connecting terminal thereon, a housing of insulating material including two housing sections fastened in cooperative proximity and shaped to define an enclosed cavity and a plurality of oppositely located slot entrances to said cavity, said semiconductor wafers being positioned and secured in spaced relation within said cavity with said sheet members extending through and substantially closing said slot entrances to afford cooling of said wafers during operation, means for connecting said wafers in series combination with like polarity from the sheet member of one of said wafers to the connecting terminal of another of said wafers, and at least one electrical terminal connected to one end of said series combination and extending through said housing.

2. An asymmetrically conductive unit comprising a plurality of semiconductor pieces, a plurality of conductive sheet members each secured to the surface of one of said pieces and extending therefrom, a plurality of connecting terminals each secured to the surface of one of said pieces, a broad area rectification barrier being present within each of said semiconductor pieces between the sheet member and the connecting terminals secured thereto, an insulating housing comprising two housing sections cooperating to define therein an enclosed cavity and a plurality of slot entrances to said cavity, means for fastening said sections together in cooperation, said semiconductor pieces and said connecting terminals being held in spaced relation within said cavity by engagement of said sheet members with said housing, said sheet members extending through said slot entrances, means for connecting said semiconductor pieces in series combination with like polarity from the sheet member of one to the connecting terminal of another, electrical terminals secured within said cavity to opposite ends of said series combination and extending through said housing, and a quantity of moisture-protective material surrounding the exposed surfaces of said pieces.

3. A mounting and connecting device for a plurality of series-connected rectifier elements of the type including a semiconductor wafer, a sheet metal member secured to one face of said wafer and extending therefrom, and an impurity deposit on the opposite face of said wafer, said wafer having a P-N junction therein intermediate said sheet member and said impurity deposit; said mounting and connecting device comprising a housing of insulating material including two housing sections, means for fastening said housing sections together in cooperative proximity, said fastened housing sections defining an enclosed cavity and a plurality of entrances to said cavity, said rectifier elements secured in spaced relation within said cavity with said sheet members extending from said entrances, said mounting and connecting device further comprising at least one conductive terminal secured to said series connected rectifier elements and extending through said housing, and a quantity of thermo-plastic moisture-protective material surrounding the exposed surfaces of the semiconductor wafers and impurity deposits of said rectifier elements.

4. An asymmetrically conductive unit comprising a plurality of semiconductor wafers, a plurality of conductive sheet members each secured to one face of one of said wafers and extending therefrom, a plurality of connecting terminals each secured to the opposite face of one of said wafers, each of said wafers having a rectification barrier therein intermediate the sheet member and the impurity deposit secured thereto, a housing of insulating material elongated along a first dimension relative to the remaining two dimensions thereof, said housing being divided along a plane parallel said first dimension and including two housing sections and means for fastening said housing sections together, an enclosed cavity and a plurality of entrances to said cavity intermediate said housing sections being defined by said fastened housing sections, said wafers and said connecting terminals being secured in coplanar spaced relation within said cavity with said sheet members extending in coplanar relation through said entrances, means within said cavity for connecting said wafers in series relation from the sheet member of one to the connecting terminal of another, a quantity of moisture-protective material surrounding the exposed surfaces of each of said wafers and said connecting terminals, and two terminals secured within said housing and connected to the end sheet member and end connecting terminal of said series connected wafers respectively, said terminals extending through said housing for affording electrical connection to said asymmetrically conductive unit.

5. An asymmetrically conductive unit comprising a plurality of semiconductor wafers, a plurality of conductive sheet members each secured to one face of one of said wafers and extending therefrom on all sides, two projections of each of said sheet members located on opposite sides of the wafer attached thereto respectively, a plurality of impurity deposits each secured on the opposite face of one of said wafers, each of said wafers having a broad area P-N junction therein intermediate the sheet member and the impurity deposit secured thereto, a housing of insulating material elongated along a first dimension relative to the remaining two dimensions thereof, said housing being divided along a plane of symmetry parallel to the direction of said first dimension and including two identical housing sections, a plurality of rivets fastening said housing sections together in mutual registry, said fastened housing sections defining an enclosed cavity and two elongated slot entrances to said cavity between said housing sections on each side thereof respectively, at least one of said housing sections defining a plurality of depressions in the faces thereof defining said slot entrances, said sheet members being clamped between said housing projections with said projections cooperating with said depressions to secure said wafers and said impurity deposits in coplanar spaced relation within said cavity and with said sheet members extending in coplanar spaced relation through said slot entrances to afford cooling of said wafers during operation, a plurality of wires within said cavity connecting said wafers in series from the sheet member secured to one wafer to the impurity deposit secured to the next adjacent wafer, a quantity of thermo-plastic material surrounding the exposed surfaces of each of said wafers and said impurity deposits to exclude moisture therefrom, and two terminals connected within said cavity to the respective ends of said series connected wafers and secured to said housing and extending from said housing to afford electrical connection to said asymmetrically conductive unit.

6. An asymmetrically conductive unit comprising a plurality of semiconductor wafers, a plurality of conductive sheet members, each secured to one face of one of said wafers and extending therefrom, a plurality of impurity deposits each secured to the opposite face of one of said wafers, each of said wafers having a broad area P-N junction therein intermediate the sheet member and the impurity deposit secured thereto, a housing of insulating material elongated along a first dimension relative to the remaining two dimensions thereof, said housing being divided along a plane parallel to said first dimension and including two housing sections, means for fastening said two housing sections together and for mounting said housing, an enclosed elongated cavity and a plurality of slot entrances to said cavity transverse to the major axis of said cavity being defined by said fastened housing sections, said wafers and said impurity deposits thereon being secured in mutually spaced parallel planes transverse to the first dimension of said housing within said cavity with said sheet members extending in spaced parallel planes through said slot entrances, means within said cavity for connecting said wafers in series relation from the sheet member of one to the impurity deposit of another, two terminal members secured within said cavity and connected to the end sheet member and end impurity deposit respectively of said series connected wafers, said terminals extending through said housing to afford electrical connection to said asymmetrically conductive unit, and a quantity of moisture-protective thermo - plastic material otherwise filling said cavity.

7. An asymmetrically conductive unit comprising a plurality of semiconductor wafers, a plurality of conductive sheet members each secured to one face of one of said wafers and extending therefrom on all sides, two projections on each of said sheet members located on opposite sides of the wafer attached thereto respectively, a plurality of connecting terminals each secured to the opposite face of one of said wafers, each of said wafers having a rectification barrier therein intermediate the sheet member and the connecting terminal secured thereto, a housing of insulating material elongated along a first dimension relative to the remaining two dimensions thereof, said housing being divided along a plane of symmetry parallel to the direction of said first dimension and including two identical housing sections, registering openings being defined through extremities of said housing sections, fastening means cooperating with said openings for fastening and mounting said housing sections, said fastened housing sections defining an enclosed elongated cavity and a plurality of slot entrances to said cavity on an opposite pair of sides of said cavity transverse to the major axis of said cavity, said sheet members being clamped in and extending in spaced parallel planes through said slot entrances with said projections external of said slot entrances and engaging said housing on opposite sides thereof and with said wafers and said connecting terminals on said wafers disposed in spaced relation within said cavity, a plurality of wires within said cavity connecting said wafers in series combination with like polarity, each of said wires connecting the sheet member secured to one of said wafers with the connecting terminal secured to the next adjacent of said wafers, two terminals connected respectively within said cavity to the remaining unconnected sheet member and connecting terminal and extending through said housing, and a quantity of thermo-plastic moisture-protective material otherwise filling said cavity.

8. A protective mounting and connecting device for a plurality of series-connected asymmetrically conductive semiconductor elements each having an extending conductive sheet member base, said mounting and connecting device comprising a housing of insulating material including two housing sections fastened in mutual registry and shaped to define an enclosed cavity and a plurality of slot entrances to said cavity, said semiconductor elements being secured in spaced relation within said cavity by engagement of said sheet member bases between said fastened housing sections and with said sheet member bases extending from said cavity through said slot entrances, and at least one terminal connected to said series-connected semiconductor elements and extending from said cavity for external connection thereto.

9. A protective mounting and connecting device for a plurality of asymmetrically conductive semiconductor elements each having an extending conductive sheet member base, said mounting and connecting device comprising a housing of insulating material defining therein an enclosed cavity and a plurality of slot entrances to said cavity, said semiconductor elements being secured in spaced relation within said cavity by said sheet member bases engaging said housing and with said sheet member bases extending from said cavity through said slot entrances, means within said cavity connecting said semiconductor elements with like polarity in series relation, at least one terminal connected to said series-connected elements extending from within said cavity for external connection thereto, and a coating of a moisture-protective material surrounding the exposed surfaces of each of said semiconductor elements.

References Cited in the file of this patent

UNITED STATES PATENTS

| Number | Name | Date |
|---|---|---|
| 2,042,542 | Masnou | June 2, 1936 |
| 2,106,344 | Flegal et al. | Jan. 25, 1938 |
| 2,117,020 | Conrad | May 10, 1938 |
| 2,217,471 | Conrad | Oct. 8, 1940 |